Figure 1:
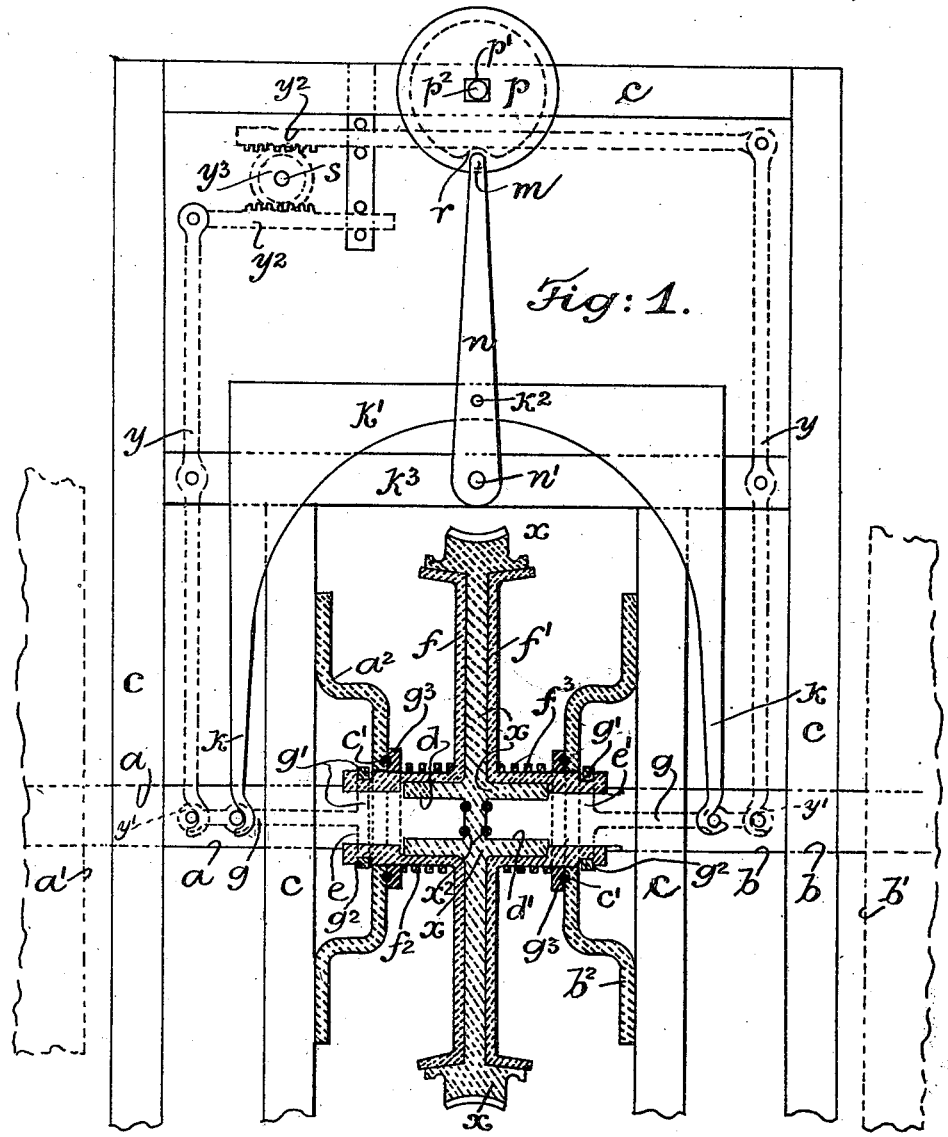
Figure 2:
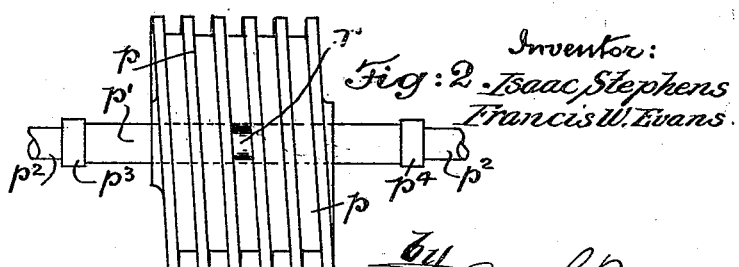

I. STEPHENS AND F. W. EVANS.
REAR AXLE CLUTCH GEAR FOR MOTOR VEHICLES.
APPLICATION FILED SEPT. 13, 1918.

1,368,856.

Patented Feb. 15, 1921.

Witnesses:

Inventor:
Isaac Stephens
Francis W. Evans

UNITED STATES PATENT OFFICE.

ISAAC STEPHENS AND FRANCIS WARREN EVANS OF IDA-H, NEAR LAVERTON, WESTERN AUSTRALIA, AUSTRALIA.

REAR-AXLE CLUTCH-GEAR FOR MOTOR-VEHICLES.

1,368,856.  Specification of Letters Patent.  Patented Feb. 15, 1921.

Application filed September 13, 1918. Serial No. 253,968.

*To all whom it may concern:*

Be it known that we, ISAAC STEPHENS and FRANCIS WARREN EVANS, both subjects of His Majesty the King of Great Britain, residing at Ida-H, near Laverton, Western Australia, Commonwealth of Australia, have invented certain new and useful Improvements in Rear-Axle Clutch-Gears for Motor-Vehicles, of which the following is a specification.

This invention relates to the driving clutch gear of the rear axles of motor vehicles and its object is to dispense with the use of the present differential gear and to substitute therefor a driving gear of a simple and direct driving nature and construction. The invention is primarily designed for motor tractors and such like slow moving vehicles but it is adapted for use with all types of motor vehicles.

The invention consists of the rear axle being made in two separate and independent halves each part being adapted to operate either in unison with or independent of each other; said axle being divided at a centrally transverse position and on the companion central terminals is conjointly and loosely carried a single rotatable gear wheel which is in operative connection with the power transmission shaft of the engine by worm or other suitable gearing. In conjunction with said gear wheel we employ a pair of companion friction grip clutches adapted to operatively engage and be released with each side of the said gear wheel. Each of said clutches is traversably held on its own axle by feather keys and operated and controlled either by independent or simultaneous levers; that is either or both clutches may be released or engaged by the same operation.

The construction and use of the invention will now be explained with the aid of the attached drawings wherein Figure —1— is a sectional plan view showing the invention as fitted on the rear axles and in conjunction with the independent and simultaneous control levers the latter denoted in broken lines and the clutches both shown in the engaged or forward drive positions. Fig. —2— shows the steering wheel and column in elevation.

Referring to said drawings the rear axle is made in two separate and independent halves as $a$ and $b$—each half part carrying its road wheel as $a^1$ and $b^1$ shown in broken lines. These axles $a$ and $b$ are suitably held in bearings $a^2$ and $b^2$ secured to the chassis or body frame $c$ of the vehicle, said bearings having ball races $c^1$ to receive the working thrust. At a central and junctional position the axle terminals $d$ and $d^1$ are made of reduced diameter in order to provide guides for the thereon loosely and conjointly carried rotatable gear wheel $x$. This wheel is adapted to intergear with the power transmission gear connected with the engine in the ordinary manner. This wheel is provided with the ball races $x^2$ which receive the end working thrust of the axles $a$ and $b$. On the portions $e$ and $e^1$ of said axles and transversely held thereon by feather keys are the slidable friction grip clutches $f$ and $f^1$. These clutches are adapted to engage with and be released from the said gear wheel $x$ and are provided with the spiral springs $f^2$—$f^3$ operating between the bearings $a^2$—$b^2$ in order to urge said clutches to their engaged positions in contact against the side faces of said wheel $x$ when released by the manually operated levers hereafter mentioned.

It is obvious that this gear wheel $x$ transmits motion and driving power to that axle or axles whose clutch or clutches are in the engaged position or positions in respect of the said wheel and which latter acts as the common driving agent for either or both of said axles $a$ and $b$. These clutches are adapted to be controlled either by independent or simultaneous levers. The independent control means comprise a horizontal arm $g$ having a forked terminal $g^1$ engaging with the grooves $g^2$ formed in the hubs $g^3$ of the clutches and to said arms $g$ are connected the rectangular terminals $k$ of a plate $k^1$ slidably mounted on the base plate $k^3$. This plate $k^1$ is pivoted at $k^2$ to a lever $n$ pivoted at $n^1$ to said base plate. Said lever $n$ at its outer end carries a contact roller $m$ for engaging with a spiral grooved wheel $p$ which is vertically and transversably carried on the square portion $p^1$ of the steering column $p^2$. This wheel is held in its working position by the top and bottom limit collars $p^3$—$p^4$. This spiral grooved wheel is made with a retention gap or recess $r$ to hold the lever $n$ when the forward drive of the vehicle is desired.

The steering column $p^2$ is held in the usual foot bearing and operates by the ordinary worm and sector gearing.

It is apparent that by turning said column either to the "right" or to the "left" the correspondingly related clutch will be either released or engaged while when the lever $n$ lies in the central "engaged" position by the retention gap $r$ both clutches are engaged with the wheel $x$ and positioned for the "forward" drive of the vehicle.

When the column $p^2$ is given several complete rotations the lever $n$ is moved from its central position by the grooves and the correspondingly related clutch maintained free from contact with the wheel $x$ until the spiral grooved wheel $p$ resumes that position which allows the roller $m$ to engage with the gap $r$ and to admit of the forward drive position of the lever $n$ and the combined engagement of the clutches against the wheel $x$, as shown in Fig. —1—. For the simultaneous control of the clutches we employ the pivotal lever arms $y$ connectible at $y^1$ to the outer ends of the forked levers $g^1$ aforesaid said arms $y$ having rectangular toothed formations $y^2$ which intermesh with a pinion $y^3$ carried on a vertical rotary shaft $s$ adapted to be operated by hand wheel in usual way. It is apparent that by turning said pinion $y^3$ either to the "right" or to the "left" the clutches will be simultaneously engaged or released.

What we claim as our invention and desire to secure by Letters Patent is—

1. In a motor vehicle, the combination with a steering column, of a pair of wheels, actuating means, means for separately controlling the connection of said wheels, respectively, with said actuating means, a lever for operating said controlling means, said lever having contact means, and a member carried by said steering column, said member having a retention gap or notch adapted to receive said contact means when said steering column is in its normal central position.

2. In a motor vehicle, the combination with a steering column, of a pair of wheels, actuating means, means for separately controlling the connection of said wheels, respectively, with said actuating means, a lever for operating said controlling means, said lever having contact means, and a spirally grooved member carried by said steering column, said member having a retention gap or notch adapted to receive said contact means when said steering column is in its normal central position.

3. In a motor vehicle, the combination with a steering column, of a two part rear axle, a transmission member rotatably mounted on the adjacent ends of the two parts of said axle, clutches for separately connecting said transmission member with said parts, respectively, springs for normally engaging said clutches, devices for disengaging said clutches, a sliding plate coöperating with said devices and movable in opposite directions to cause the disengagement of said clutches, respectively, a lever for operating said plate, and a spirally grooved wheel carried by said steering column and having a retention gap, said wheel being adapted to make operative contact with said lever.

In testimony whereof we have hereunto set our hands in presence of two subscribing witnesses.

ISAAC STEPHENS.
FRANCIS WARREN EVANS.

Witnesses:
    JOHN ARTHUR RICHARDSON,
    FRED HANSEN.